United States Patent
Brissette et al.

(10) Patent No.: US 10,436,470 B2
(45) Date of Patent: Oct. 8, 2019

(54) RULE-BASED LOAD SHEDDING ALGORITHM FOR BUILDING ENERGY MANAGEMENT

(71) Applicant: ABB Schweiz AG, Baden (CH)

(72) Inventors: Alexander Brissette, Raleigh, NC (US); Joseph A Carr, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 106 days.

(21) Appl. No.: 15/653,478

(22) Filed: Jul. 18, 2017

(65) Prior Publication Data

US 2019/0024918 A1    Jan. 24, 2019

(51) Int. Cl.
*F24F 11/46* (2018.01)
*F24F 11/30* (2018.01)
(Continued)

(52) U.S. Cl.
CPC .......... *F24F 11/30* (2018.01); *F24D 19/1048* (2013.01); *F24F 11/62* (2018.01);
(Continued)

(58) Field of Classification Search
CPC ...................................................... F24F 11/46
See application file for complete search history.

(56) References Cited

U.S. PATENT DOCUMENTS 5,682,949 A    11/1997 Ratcliffe et al.
2004/0002792 A1    1/2004 Hoffknecht
(Continued)

FOREIGN PATENT DOCUMENTS

GB    2212949    8/1989
JP    2005261050    9/2005
(Continued)

OTHER PUBLICATIONS

Encelium Energy Management System Software, Niagara AX Drive, Osram , May 13, 2013, Available at: assets2.osram-americas.com/im/img/us-dam-62056, last accessed Jul. 18, 2017, 2 pgs.
(Continued)

*Primary Examiner* — Thomas C Lee
*Assistant Examiner* — Gary Collins
(74) *Attorney, Agent, or Firm* — Taft Stettinius & Hollister LLP; J. Bruce Schelkopf

(57) ABSTRACT

Unique systems, methods, techniques and apparatuses of building power management are disclosed herein. One exemplary embodiment is a system comprising a load management controller and a power circuit interrupter. The load management controller is configured to repeatedly perform a first test wherein a time rate of change of temperature of building regions is determined, repeatedly perform a second test wherein a lighting controller is operated to rank a plurality of lighting loads according to ambient light of building regions associated with the plurality of lighting loads, assign the plurality of HVACR loads and lighting loads to a plurality of load shed groups, and reduce power consumption by the plurality of HVACR loads and the plurality of lighting loads in order of the ranked load shed groups effective to minimize occupant perceptibility of the power consumption reduction while implementing the operator specified priority criteria.

20 Claims, 3 Drawing Sheets

(51) Int. Cl.

| | | |
|---|---|---|
| *F24F 11/62* | (2018.01) | |
| *F24H 9/00* | (2006.01) | |
| *H05B 37/02* | (2006.01) | |
| *F24D 19/10* | (2006.01) | |
| *H04W 4/38* | (2018.01) | |
| *H04W 4/33* | (2018.01) | |
| *F24F 140/60* | (2018.01) | |
| *F24F 140/50* | (2018.01) | |
| *F24F 11/65* | (2018.01) | |
| *F24F 110/10* | (2018.01) | |
| *F24F 11/54* | (2018.01) | |
| *G05B 15/02* | (2006.01) | |

(52) U.S. Cl.
CPC ............ *F24H 9/0005* (2013.01); *H04W 4/33* (2018.02); *H04W 4/38* (2018.02); *H05B 37/0218* (2013.01); *H05B 37/0227* (2013.01); *F24F 11/46* (2018.01); *F24F 11/54* (2018.01); *F24F 11/65* (2018.01); *F24F 2110/10* (2018.01); *F24F 2140/50* (2018.01); *F24F 2140/60* (2018.01); *G05B 15/02* (2013.01); *H05B 37/02* (2013.01)

(56) References Cited

U.S. PATENT DOCUMENTS

| | | | | |
|---|---|---|---|---|
| 2009/0240381 | A1* | 9/2009 | Lane | H02J 3/14 700/296 |
| 2009/0243517 | A1* | 10/2009 | Verfuerth | H05B 37/0272 315/315 |
| 2009/0315485 | A1* | 12/2009 | Verfuerth | H05B 37/0272 315/320 |
| 2010/0070091 | A1* | 3/2010 | Watson | G06Q 50/06 700/278 |
| 2010/0114385 | A1 | 5/2010 | Dempster et al. | |
| 2010/0324962 | A1* | 12/2010 | Nesler | G01R 21/133 705/7.36 |
| 2011/0054698 | A1 | 3/2011 | Dempster et al. | |
| 2011/0106328 | A1* | 5/2011 | Zhou | G05B 13/024 700/291 |
| 2011/0166710 | A1* | 7/2011 | Kordik | H02J 3/14 700/277 |
| 2012/0053741 | A1* | 3/2012 | Beyerle | G06F 1/3203 700/291 |
| 2012/0150509 | A1 | 6/2012 | Shiel | |
| 2012/0296451 | A1 | 11/2012 | Kaps et al. | |
| 2013/0030590 | A1* | 1/2013 | Prosser | H02J 3/14 700/295 |
| 2013/0085614 | A1 | 4/2013 | Wenzel | |
| 2013/0090777 | A1* | 4/2013 | Lu | H02J 3/14 700/297 |
| 2013/0197702 | A1* | 8/2013 | Arvind | H02J 3/005 700/286 |
| 2013/0231793 | A1* | 9/2013 | Elliott | G05B 15/02 700/292 |
| 2013/0282181 | A1* | 10/2013 | Lu | H02J 3/14 700/275 |
| 2013/0310986 | A1 | 11/2013 | Gust et al. | |
| 2014/0015418 | A1* | 1/2014 | Pandharipande | H05B 37/0218 315/152 |
| 2014/0039686 | A1* | 2/2014 | Corbin | G05D 23/1923 700/276 |
| 2014/0297206 | A1* | 10/2014 | Silverman | G01R 22/063 702/58 |
| 2015/0167997 | A1* | 6/2015 | Saffre | F24F 11/30 700/276 |
| 2016/0013646 | A1* | 1/2016 | Akerson | H02J 3/14 307/39 |
| 2016/0061469 | A1 | 3/2016 | Albonesi et al. | |
| 2017/0300193 | A1* | 10/2017 | Ray | G06F 3/0482 |
| 2018/0191197 | A1* | 7/2018 | Carr | H02J 13/0013 |

FOREIGN PATENT DOCUMENTS

| | | |
|---|---|---|
| KR | 1020150025761 | 3/2015 |
| WO | 2016062923 | 4/2016 |

OTHER PUBLICATIONS

Wolins, David et al. "Innovatoins in Comfort, Efficiency, and Safety Solutions", Automated Buildings.com May 12, 2017, Available at: http://www.automatedbuildings.com/news/jun06/articles/enflex/060526044909enflex.htm, last accessed Jul. 18, 2017, 6 pgs.

SACE Emax 2; From Circuit Breaker to Power Manager; Available at: http://new.abb.com/low-voltage/products/circuit-breakers/emax2, last accessed on Jul. 18, 2017, 2 pgs.

International Search Report and Written Opinion, PCT/US18/42622 dated Oct. 18, 2018, 11 pgs.

* cited by examiner

RULE-BASED LOAD SHEDDING ALGORITHM FOR BUILDING ENERGY MANAGEMENT

BACKGROUND

The present disclosure relates generally to reducing power consumption in a building. Building power management systems, also known as building automation systems, can regulate building power consumption to reduce costs or assist utility grids in responding to peak demand periods. In response to a request to reduce power consumption, a building automation system temporarily turns off a controllable load. Existing building automation systems suffer from a number of shortcomings and disadvantages. There remain unmet needs including reducing occupant perceptibility and increasing user control of building load operations. For instance, disrupting a heating, ventilation, air conditioning and refrigeration (HVACR) load during a demand response time period may cause the occupants of the building zone associated with the HVACR load discomfort. Furthermore, turning off lighting loads may render a building zone unusable. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for building power management. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
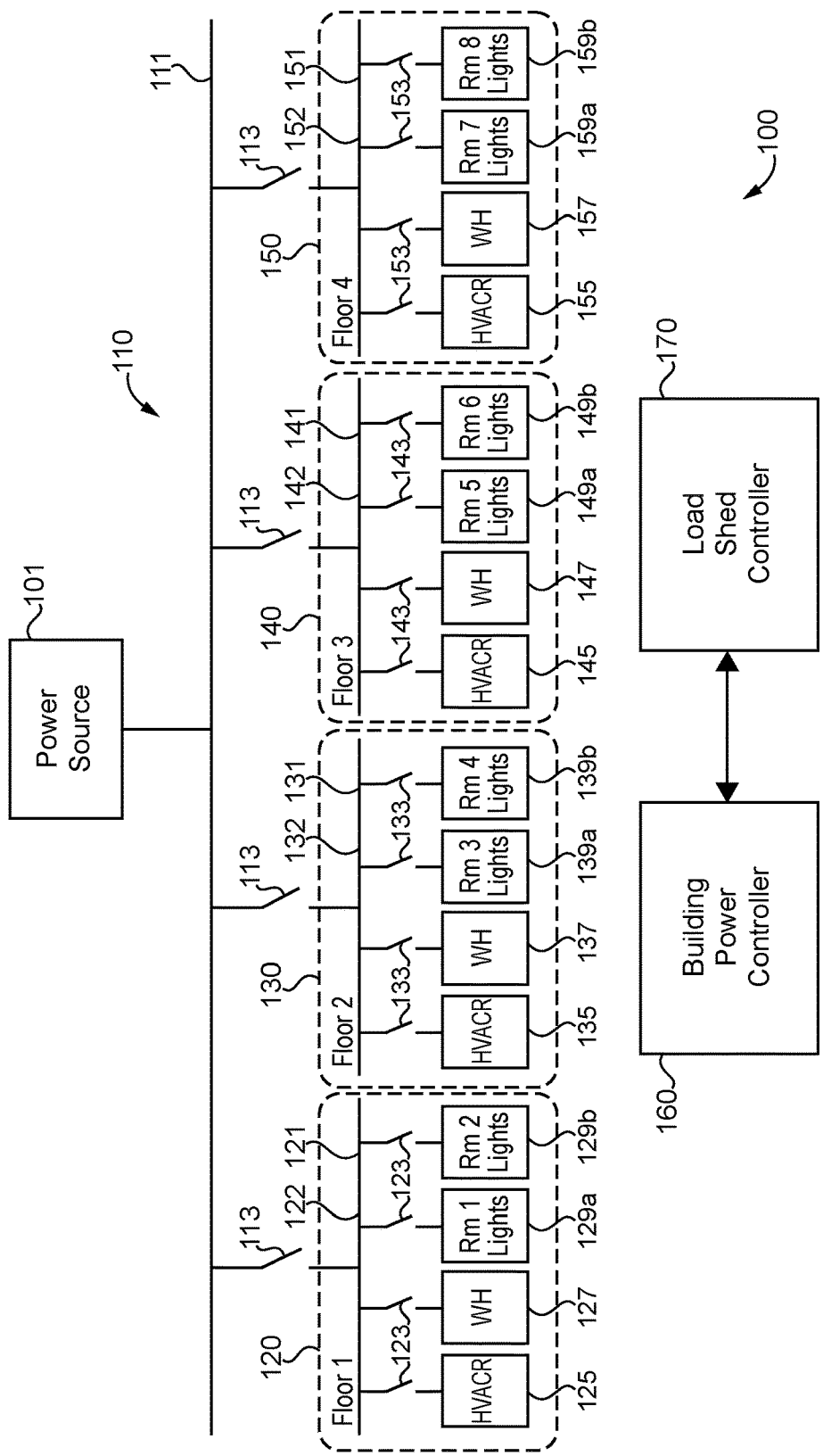
FIG. 1 illustrates an exemplary building power management system.

With reference to FIG. 1 there is illustrated an exemplary building power distribution system 100. It shall be appreciated that system 100 may be implemented in a variety of applications, including residential facilities, commercial facilities, industrial facilities, or multi-building complexes, to name but a few examples. It shall be appreciated that the topology of system 100 is illustrated for the purpose of explanation and is not intended as a limitation of the present disclosure. Although system 100 is illustrated with a single line diagram, system 100 may be structured to distribute single phase alternating current (AC) power or multiphase AC power. Furthermore, system 100 may be structured to distribute direct current (DC) power.

System 100 is coupled to a power source 101 structured to provide power to system 100. Power source 101 may be a utility grid, distributed energy resource, or any other type of power source. Power source 101 is coupled to a distribution bus 111. Four distribution branches are coupled to bus 101. Circuit breakers 113 are operatively coupled to each branch. In certain embodiments, each circuit breaker includes an intelligent electronic device structured to measure electrical characteristics of power flowing from source 101 and transmit the measurement. Each circuit breaker 113 is structured to interrupt the flow of current in response to receiving an open command. In other embodiments, one or more of the circuit breakers 113 may be replaced by any time of power circuit interrupter such as controllable switches or a protection device structured to interrupt the flow of current and communicate with a controller. It shall be appreciated that any or all of the foregoing features of circuit breakers 113 may also be present in the other circuit breakers disclosed herein.

Each branch is structured to couple between bus 101 and one of four distribution subsystems 120, 130, 140, and 150. In the illustrated embodiment, each subsystem is structured to receive power from power source 101 and transmit power to loads associated with one floor of a building. Subsystem 120 includes a bus 122 coupled to bus 101 and a plurality of loads including a heating, ventilation, air conditioning, and refrigeration (HVACR) system 125, a water heater 127, and two sets of room lights 129a, 129b. A circuit breaker 123 is operatively coupled between each load and bus 122.

HVACR 125 is structured to measure characteristics of Floor 1, such as temperature or oxygen levels, and transmit the measurements. HVACR 125 may also be structured to detect occupants located on Floor 1. HVACR 125 operates so as to maintain a condition of Floor 1 at a set point. For example, HVACR 125 may be an air conditioner including a thermostat and structured to maintain a temperature at or below 72 degrees Fahrenheit on Floor 1.

Water heater 127 is structured to heat a tank of water to a temperature set point, measure the temperature of the water, and transmit the measurement. Water heater 127 may be structured to provide heated water to all fixtures on Floor 1, or may provide water to a single fixture. In other embodiments, water heater 127 may be replaced with any kind of thermal storage device.

Each set of room lights 129a, 129b includes a set of controllable lights and may include a lighting controller structured to control the set of controllable lights so as to maintain artificial lighting or total lighting, including ambient lighting, at a lighting set point. The lighting controller may be structured to measure ambient light conditions and detect occupants within the room associated with the set of lights. In certain embodiments, a set of room lights may be one of a plurality of sets of lights within one room, or may be distributed throughout more than one room.

It shall be appreciated that any or all of the foregoing features of distribution subsystem 120 may also be present in the other subsystems disclosed herein, including the described characteristics of HVACR 125, water heater 127, and the sets of room lights 129*a*, 129*b*.

Subsystem 130 includes a bus 132 coupled to bus 101, a heating, ventilation, air conditioning, and refrigeration (HVACR) system 135, a water heater 137, and two sets of room lights 139*a*, 139*b*. Each load is coupled to bus 132 by way of a circuit breaker 133. Subsystem 140 includes a bus 142 coupled to bus 101, a heating, ventilation, air conditioning, and refrigeration (HVACR) system 145, a water heater 147, and two sets of room lights 149*a*, 149*b*. Each load is coupled to bus 142 by way of a circuit breaker 143. Subsystem 150 includes a bus 152 coupled to bus 101, a heating, ventilation, air conditioning, and refrigeration (HVACR) system 155, a water heater 157, and two sets of room lights 159*a*, 159*b*. Each load is coupled to bus 152 by way of a circuit breaker 153.

System 100 includes a building power controller 160 structured to receive target power consumption requests. Each request may originate from a central control system, a utility grid system operator, a local control system, or a building manager. The target power consumption request is effective to raise or lower a load shed threshold, also known as a target power consumption value. Requests may be transmitted as part of a utility demand management program such as demand response or load curtailment. Requests may include a total target power consumption amount for a building or an amount by which power consumption should be reduced. Controller 160 may be structured to communicate with one or more of the circuit breakers of system 100. In certain embodiments, controller 160 is structured to determine the power consumed by each load of system 100, identify the least critical loads, and transmit an open command to the circuit breakers associated with the least critical loads so as to reduce the power consumption of the building in response to the received target power consumption request. Building power controller 160 may also transmit a close command to a portion of the circuit breakers of system 100 so as to restore power to loads previously shut off.

System 100 includes a load shed controller 170 structured to receive load shed signals from controller 160. Controller 170 is also structured to receive input from a user. For example, a load shed signal may include open commands intended to be sent to circuit breakers of system 100. The load shed signal may indicate a required load reduction amount or a load restoration command. Controller 170 is structured to prioritize controllable loads such as the HVACRs, water heaters, and lights of system 100. Controller 170 is also structured to control load set points so as to maintain power consumption below a target value received by controller 160. Controller 170 may receive the load shed signal from controller 160, override open commands sent to circuit breakers, and instead reduce power consumption of system 100 by reducing set points of controllable loads. In certain embodiments, controller 160 and controller 170 may include a common hardware device structured to perform the functionality described with response to controller 160 and controller 170.

Figure 2:
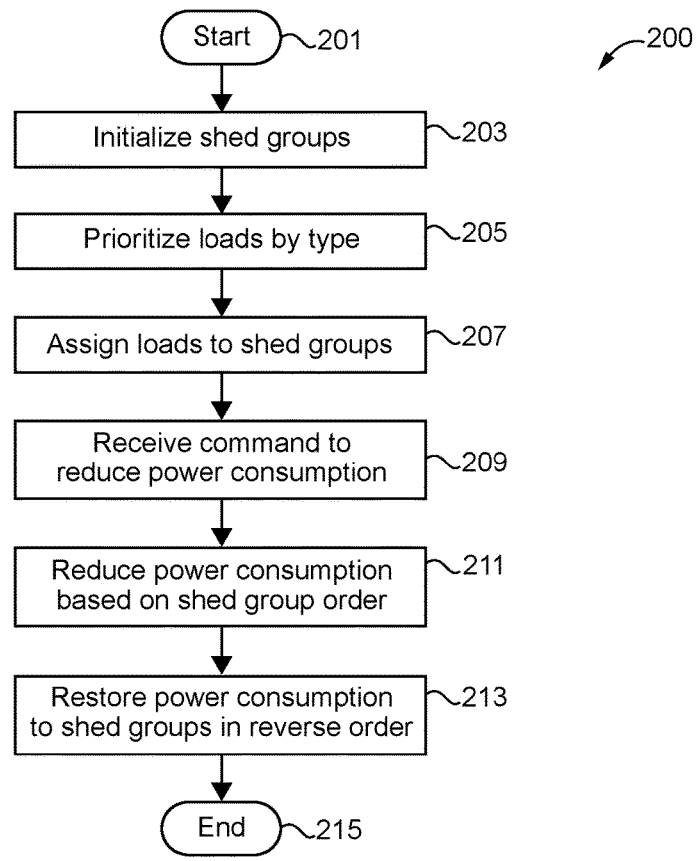
FIG. 2 illustrates an exemplary load shedding process.

With reference to FIG. 2 there is a flowchart illustrating an exemplary process 200 for load shedding using a load shed controller. Process 200 may be implemented in whole or in part in one or more of the controllers disclosed herein. In certain forms the load shedding and load prioritization functionalities may be performed by separate controllers. In certain forms, all functionalities may be performed by the same controller. The following description of process 200 is made with reference to system 100 illustrated in FIG. 1. It is to be understood, however, that process 200 may be used in combination with other controllers for power distribution systems.

Process 200 begins at start operation 201 and proceeds to operation 203 where controller 170 initializes a load shedding organizational hierarchy by defining load shed groups. Controllable building loads may be initially assigned to load shed groups based on default priority lists created by a building manager and/or a set of business rules input by the building manager. For example, a building manager may input a rule to controller 170 which prioritizes reducing lighting over adjusting HVACR set points. In addition to load shed group assignment, the hierarchy may be initialized by defining changes in set points for each shed group, assigning an initial occupancy status to certain loads, defining an initial load shed threshold value or an initial load restoration threshold value, to name but a few examples.

Process 200 proceeds to 205 where load shed controller 170 receives measurements corresponding to environmental conditions of a building as well as operating conditions of controllable loads. Each type of controllable load is prioritized such that the least critical loads would be the first loads to be shed in response to a reduction request. In certain embodiments, loads are assigned to zones and the prioritization occurs with respect to each zone. For example, all sets of room lights of a building in rooms facing the south side of a building could be grouped into one lighting zone.

HVACR loads may be prioritized based on occupancy and thermal properties of an associated building zone. For example, HVAC loads in an occupied building zone may be prioritized based on the expected rate of change in temperature following a change in HVACR load set point. To determine the expected rate of change in temperature, load shed controller 170 may operate each HVACR load so as to shut off for a period of time and measure the temperature drift during the period of time. Alternatively, load shed controller 170 operates each HVACR load so as to shut off until the associated building zone experiences a defined change in temperature, measuring the amount of time to complete the test. In certain embodiments, every HVACR load is tested simultaneously, beginning at a universal set point. In certain embodiments, load shed controller 170 calculates expected rate of change in temperature using historical data. Load shed controller 170 may perform testing periodically or in response to a request from building power controller 160. For example, controller 170 may perform a test hourly or daily. Controllable loads in unoccupied building zones may be grouped together as one zone and operated without being assigned a priority level. When load shed controller 170 determines a building zone becomes occupied, the associated HVACR load is removed from the group of controllable loads in unoccupied building zones and prioritized according to expected rate of change in temperature.

Occupancy status of a building zone may be determined by one or more sensors located in the building zone. For example, an occupancy sensor may be a motion sensor, an infrared sensor, a camera, a $CO_2$ sensor, a pressure plate, a radar sensor, a sonar sensor, a time of flight sensor, active tags, passive tags, or any other type of sensor structured to detect a human being.

In certain embodiments, all water heaters of a building are treated as one water heater zone and controlled together. In other embodiments, water heaters are prioritized based on environmental conditions such as room occupancy or physical conditions like water heater temperature.

Lighting may be prioritized based on occupancy and ambient lighting conditions of each room or zone. For example, zones with high ambient lighting may be assigned low priority, while zones with no ambient lighting may be assigned high priority. Zones with a lighting controller without an ambient light sensor may be assigned a higher priority than zones with a lighting controller structured to measure ambient light. Lighting in unoccupied zones are turned off and not assigned a priority level.

Process 200 proceeds to operation 207 where controller 170 assigns each controllable load to a shed group. Shed group assignment is based on the load prioritization performed in operation 205 as well as a set of rules defined by a user, such as the rules input by the user in operation 203. In certain embodiments, process 200 repeatedly performs operations 205 and 207 until controller 170 receives a load shed signal so as to maintain a dynamic shed group assignment.

Process 200 proceeds to operation 209 where controller 170 receives a load shed signal indicating the building power consumption must be reduced below a threshold value. In certain embodiments, load shed controller 170 sheds each shed group in response to input from a building manager in real-time or a preprogrammed building manager schedule. In certain embodiments, load shed controller 170 sheds each load group in response to comparing total power consumption of the building to a load shed threshold value. In certain embodiments, load shed controller 170 sheds load groups in response to an external signal, such as a signal from building power controller. A building power controller is structured to monitor and control building power consumption by controlling contactors or circuit breakers associated with loads within a building. The building power controller determines which loads to shed based on a fixed priority list. The building power controller may specifically generate a command by shed group, treating each shed group as a virtual load. Controller 170 may also interpret signals from the building power controller and shed groups instead of loads intended to be shed by the building power controller.

Figure 3:
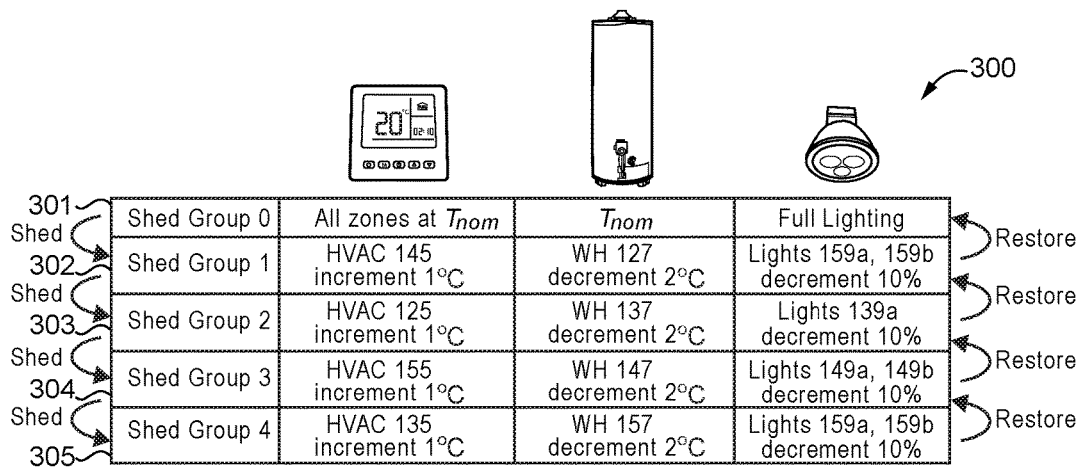
FIG. 3 is a table illustrating an exemplary ranking of load shed groups.

Process 200 proceeds to operation 211 where load shed controller 170 reduces the power consumption of the building by reducing power to the shed groups in order. With reference to FIG. 3 there is a table 300 illustrating shed groups controlled by load shed controller 170 in FIG. 1. Table 300 includes rows 301-305, each representing one shed group. Each shed group includes a set of loads and a set of load shed commands. For example, row 302 represents the first shed group to be effected by a power consumption reduction. The first shed group includes HVACR 145, water heater 127, and room light sets 159a, 159b. For each device, a load shedding action is defined. For HVACR 145, power consumption will be reduced by incrementing the temperature set point. For water heater 127, power consumption will be reduced by decrementing the temperature set point. For room light sets 159a and 159b, power consumption will be reduced by decreasing lighting.

Each load shedding action may be defined by business rules input by a user. In certain embodiments, load shedding actions may be different for each shed group. For example, a first shed group may include a load shed action to reduce an HVACR set point by one degree while a second shed group includes a load shed action to reduce another HVACR by two degrees. As illustrated with rows 302 and 305, some controllable loads may be included in more than one load shed group. There is no restriction on the number of shed groups or the number or nature of actions assigned to a shed group.

With continuing reference to FIG. 2, process 200 proceeds to operation 213 where load controller 170 restores power to the shed groups affected by the power reduction. Load shed controller 170 may begin to restore power to shed groups in response to a signal from building power controller 160. In certain embodiments, load shed controller 170 may begin to restore power to shed groups in response to controller 170 comparing facility power consumption to a load restoration threshold store in memory on controller 170. In other embodiments, load shed controller 170 may begin to restore power to shed groups a certain time after controller 170 began to shed load groups. For example, controller 170 may begin to shed power in response to a demand response request, and may subsequently begin to restore shed groups after a time interval defined by the demand response request.

Figure 4:
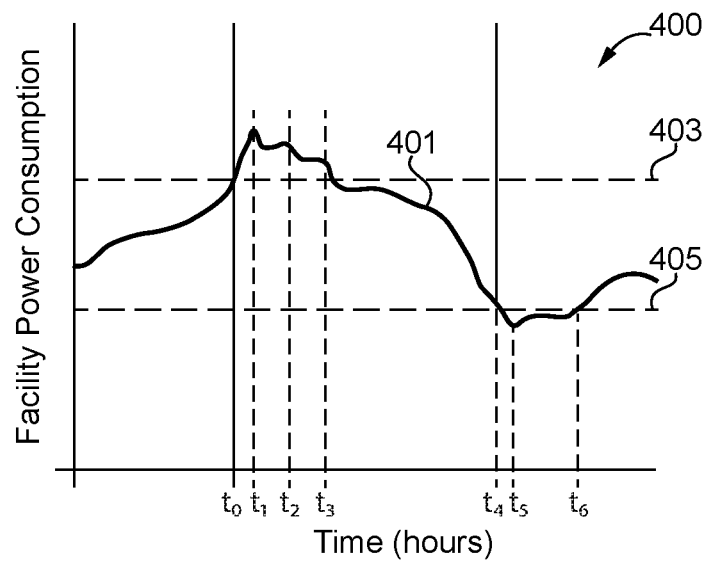
FIG. 4 is a graph illustrating the operation of the exemplary building power management system.

With reference to FIG. 4 there is a graph 400 illustrating the operation of an exemplary load shed controller, such as load shed controller 170 of FIG. 1. Graph 400 includes line 401 illustrating facility power consumption over time. Graph 400 also includes a load shed threshold 403 and a load restoration threshold 405. At time t0, power consumption exceeds load shed threshold 403. In response, the load shed controller sheds a first shed group at time t1. Since shedding the first group did not reduce the facility power consumption below load shed threshold 403, the load shed controller sheds the second shed group at time t2, then the third shed group at time t3. The load shed controller then stops shedding loads since the facility power consumptions falls below load shed threshold 403.

At time t4, the facility power consumption is less than load restoration threshold 405. In response, the load shed controller begins to restore the shed groups in reverse order of load shedding. At time t5, the load shed controller restores the third shed group. Since restoring the third shed group did not increase the facility power consumption to a value greater than load restoration threshold 405, the load shed controller restores the second shed group at time t6. In certain embodiments, thresholds 403 and 405 may be dynamically modified in response to demand response requests or input from a building manager.

Process 200 proceeds to end operation 215. It shall be further appreciated that a number of variations and modifications to process 200 are contemplated including, for example, the omission of one or more aspects of process 200, the addition of further conditionals and operations or the reorganization or separation of operations and conditionals into separate processes.

Figure 5:
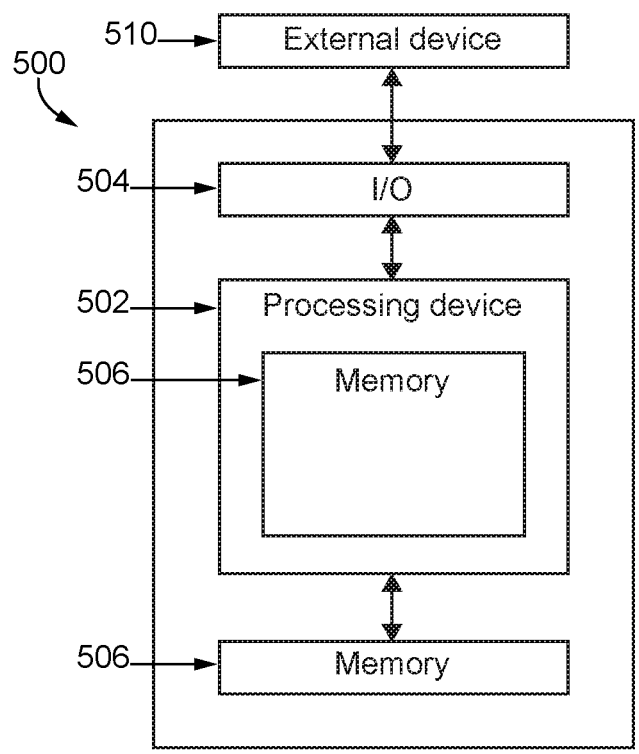
FIG. 5 is a block diagram illustrating an exemplary controller.

With reference to FIG. 5, there is illustrated a schematic block diagram of a computing device 500. Computing device 500 is one example of a building power controller or a load shed controller which is used, in different embodiments, in connection with an exemplary building power distribution system, such as system 100 shown in FIG. 1. Computing device 500 includes a processing device 502, an input/output device 504, and a memory device 506. Computing device 500 may be a stand-alone device, an embedded system, or a plurality of devices structured to perform the functions described with respect to building power controller 160 or load shed controller 170. Furthermore, computing device 500 communicates with one or more external devices 510.

Input/output device 504 enables the computing device 500 to communicate with external device 510. For example, input/output device 504 in different embodiments may be a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 504 is comprised of hardware, software, and/or firmware. It is contemplated that input/output device 504 includes more than one of these adapters, credentials, or ports, such as a first port for receiving data and a second port for transmitting data.

External device 510 in different embodiments is any type of device that allows data to be input or output from computing device 500. For example, external device 510 in different embodiments is a mobile device, a reader device, equipment, a handheld computer, a diagnostic tool, a controller, a computer, a server, a printer, a display, an alarm, a visual indicator, a keyboard, a mouse, a circuit breaker, a controllable load, a thermostat, a lighting controller, or a touch screen display. Furthermore, it is contemplated that external device 510 is be integrated into computing device 500. It is further contemplated that more than one external device is in communication with computing device 500.

Processing device 502 in different embodiments is a programmable type, a dedicated, hardwired state machine, or a combination of these. Device 502 can further include multiple processors, Arithmetic-Logic Units (ALUs), Central Processing Units (CPUs), Digital Signal Processors (DSPs), Field-programmable Gate Array (FPGA), to name but a few examples. For forms of processing device 502 with multiple processing units, distributed, pipelined, or parallel processing can be used as appropriate. Processing device 502 may be dedicated to performance of just the operations described herein or may be utilized in one or more additional applications. In the illustrated form, processing device 502 is of a programmable variety that executes processes and processes data in accordance with programming instructions (such as software or firmware) stored in memory device 506. Alternatively or additionally, programming instructions are at least partially defined by hardwired logic or other hardware. Processing device 502 can be comprised of one or more components of any type suitable to process the signals received from input/output device 504 or elsewhere, and provide desired output signals. Such components may include digital circuitry, analog circuitry, or a combination of both.

Memory device 506 in different embodiments is of one or more types, such as a solid-state variety, electromagnetic variety, optical variety, or a combination of these forms, to name but a few examples. Furthermore, memory device 506 can be volatile, nonvolatile, transitory, non-transitory or a combination of these types, and some or all of memory device 506 can be of a portable variety, such as a disk, tape, memory stick, cartridge, to name but a few examples. In addition, memory device 506 can store data that is manipulated by processing device 502, such as data representative of signals received from or sent to input/output device 504 in addition to or in lieu of storing programming instructions, just to name one example. As shown in FIG. 5, memory device 506 may be included with processing device 502 or coupled to processing device 502, but need not be included with both.

Further written description of a number of exemplary embodiments shall now be provided. One embodiment is a power management system comprising a power circuit interrupter operatively coupled with a first subset of the metered plurality of electrical loads, the power circuit interrupter configured to interrupt power to the first subset of the metered plurality of electrical loads in response to a load shed signal; and a load management controller operatively coupled with a second subset of the metered plurality of electrical loads, the second subset comprising a plurality of building lighting loads and a plurality of building HVACR loads, in operative communication with the power circuit interrupter, and configured to repeatedly perform an evaluation of net power consumption of a metered plurality of electrical loads relative to a power consumption criterion, repeatedly perform a first test wherein operation of the plurality of HVACR loads is suspended and a time rate of change of temperature of building regions associated with respective ones of the plurality of HVACR loads is determined effective to dynamically rank load shedding priority of the plurality of HVACR loads according to their respective time rate of change of temperature, repeatedly perform a second test wherein a lighting controller is operated to rank a plurality of lighting loads according to ambient light of building regions associated with the plurality of lighting loads, effective to dynamically rank load shedding priority of the plurality of lighting loads according to ambient light of their associated building regions, assign the plurality of HVACR loads and the plurality of lighting loads to a plurality of load shed groups according to operator specified priority criteria, rank the plurality of load shed groups using the load shedding priority rank of the plurality of HVACR loads and the load shedding priority rank of the plurality of light loads assigned to each of the plurality of load shed groups, and generate the load shed signal so as to reduce power consumption by the plurality of HVACR loads and the plurality of lighting loads according to the ranked load shed groups effective to minimize occupant perceptibility of the power consumption reduction while implementing the operator specified priority criteria.

In certain forms of the foregoing system, the second subset includes one or more building water heater loads, and wherein the second load management controller is configured to rank load shedding priority of the plurality of building water heater loads and assign the plurality of building water heater loads to the plurality of load shed groups according to operator specified priority criteria. In certain forms, the load management controller is configured to determine an occupancy status for each building region associated with respective ones of the plurality of HVACR loads, and wherein dynamically ranking load shedding priority of the plurality of HVACR loads includes evaluating each determined occupancy status. In certain forms, the load management controller determines the occupancy status for each building region associated with respective ones of the plurality of HVACR loads using a motion sensor. In certain forms, the load management controller is configured to determine an occupancy status for each building region associated with the plurality of lighting loads, and wherein dynamically ranking load shedding priority of the plurality of lighting loads includes evaluating each determined occupancy status. In certain forms, the load management controller is configured to initialize the plurality of load shed groups by using the operator specified priority criterion to assign the plurality of HVACR loads and the plurality of lighting loads initially to one of the plurality of load shed groups. In certain forms, the load management controller is configured to increase power consumption of the plurality of HVACR loads and the plurality of lighting loads in reverse order of the ranked load shed groups in response the evaluation of net power consumption of the metered plurality of electrical loads relative to the power consumption criterion.

Another exemplary embodiment is a building power management system comprising a building power controller configured to measure power consumption of a building, periodically receive a power consumption target value, and transmit a load shed signal in response to determining the measured power consumption is greater than the power consumption target value, a power interruption device structured to receive the load shed signal from the building power controller and interrupt the flow of power to a building load in response to receiving the load shed signal from the building power controller, a load shed controller in communication with the building power controller and a plurality of controllable building loads including at least one of a plurality of HVACR loads each corresponding to one of a plurality of HVACR zones, and a plurality of lighting loads each corresponding to one of a plurality of lighting zones, the controller being configured to operate each of the plurality of HVACR loads in a testing mode during which the HVACR load is turned off, the change in temperature of the corresponding HVACR zone between a first time and a second time of a testing time period is measured, and the length of time between the first and the second time is measured, calculate a rate of temperature change for each of the plurality of HVACR zones using the testing time period length measurement and the change in temperature measurement, dynamically rank the plurality of HVACR loads according to an occupancy status of each of the plurality of HVACR zones and the calculated rate of temperature change, dynamically rank the plurality of lighting loads according to an occupancy status of each of the plurality of lighting zones and ambient light conditions, assign each of the plurality of HVACR loads and each of the lighting loads to at least one of a plurality of ranked shed groups including a first ranked shed group and a second ranked shed group using the rankings of the plurality of HVACR loads, the rankings of the plurality of lighting loads, and operator specified business rules, reduce power consumption of the building in response to receiving the load shed signal by adjusting an HVACR set point of each of the plurality of HVACR loads assigned to the first ranked shed group and adjusting a lighting set point of each of the plurality of lighting loads assigned to the first ranked shed group, and further reduce power consumption of the building in response to receiving the load shed signal by adjusting the HVACR set point of each of the plurality of HVACR loads assigned to the second ranked shed group and adjusting the lighting set point of each of the plurality of lighting loads assigned to the second ranked shed group.

In certain forms of the foregoing system, the power consumption target value is received from a utility grid system operator as part of a demand response program. In certain forms, the load shed controller adjusts the HVACR set points and lighting set points associated with the second ranked shed group in response to determining the measured power consumption still exceeds the target power consumption value following adjusting the HVACR set points and lighting set points associated with the first ranked shed group. In certain forms, the plurality of controllable building loads includes a thermal storage device and the load shed controller is configured to assign the thermal storage device to the first ranked shed group and wherein reducing the power consumption of the building in response to receiving the load shed signal includes reducing the set point of the thermal storage device. In certain forms, the building power controller is structured to transmit a load activation command in response to comparing the measured power consumption and a target power restoration value, and wherein the load controller is configured to increase power consumption of the second ranked load shed group in response to the load activation command, and increasing the power consumption of the first ranked load shed group in response to determining the target power restoration value is greater than the measured power consumption following increasing the power consumption of the second ranked load shed group. In certain forms, the magnitude of each adjustment to HVACR set points and lighting set points is set using operator specified values. In certain forms, each of the plurality of HVAC loads corresponding to an unoccupied HVACR zone is assigned to the first ranked load shed group and each of the plurality of lighting loads corresponding to an unoccupied lighting zone is assigned to the first ranked load shed group. In certain forms, the load shed controller is configured to operate each of the HVAC loads in a testing mode and update the calculated rate of temperature change for each of the plurality of HVACR zones periodically.

A further exemplary embodiment is a method for reducing power consumption in a building comprising operating a first load management controller configured to perform an evaluation of net power consumption of a metered plurality of electrical loads relative to a power consumption criterion and to send a load shed signal responsive to the evaluation; operating a power circuit interrupter in operative communication with the first load management controller and operatively coupled with a first subset of the metered plurality of electrical loads, the power circuit interrupter configured to interrupt power to the first subset of the metered plurality of electrical loads in response to the load shed signal; and operating a second load management controller in operative communication with the first load management controller and operatively coupled with a second subset of the metered plurality of electrical loads, the second subset comprising at least two of a plurality of building lighting loads, a plurality of building HVACR loads, and a plurality of thermal storage loads; repeatedly performing, with the second load management controller, a first test wherein operation of the plurality of HVACR loads is suspended and a time rate of change of temperature of building regions associated with respective ones of the plurality of HVACR loads is determined effective to automatically and dynamically rank load shedding priority of the plurality of HVACR loads according to their respective time rate of change of temperature; repeatedly performing, with the second load management controller, a second test wherein a lighting controller is operated to rank a plurality of lighting loads according to ambient light of building regions associated with the plurality of lighting loads, effective to automatically and dynamically rank load shedding priority of the plurality of lighting loads according to ambient light of their associated building regions; assigning, with the second load management controller, the plurality of HVACR loads and the plurality of lighting loads to a plurality of load shed groups according to operator specified priority criteria; ranking, with the second load management controller, the plurality of load shed groups using the load shedding priority rank of the plurality of HVACR loads and the load shedding priority rank of the plurality of light loads assigned to each of the plurality of load shed groups, and reducing, with the second load management controller, power consumption by the plurality of HVACR loads and the plurality of lighting loads in order of the ranked load shed groups effective to minimize occupant perceptibility of the power consumption reduction while implementing the operator specified priority criteria in response to the load shed signal.

In certain forms of the foregoing method, assigning includes determining whether each of the building regions associated with each of the plurality of HVACR loads is occupied, and assigning each of the plurality of HVACR loads associated with an unoccupied building region to the lowest priority load shed group. In certain forms, reducing includes adjusting a set point of each HVACR load, lighting load, or thermal storage load associated with the load shed group by an operator specified value. In certain forms, the evaluation of net power consumption of the metered plurality of electrical loads relative to the power consumption criterion is performed in real-time. In certain forms, the power consumption criterion is modified in response to a demand response signal received from a system operator.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A power management system comprising:
   a power circuit interrupter operatively coupled with a first subset of a metered plurality of electrical loads, the power circuit interrupter configured to interrupt power to the first subset of the metered plurality of electrical loads in response to a load shed signal; and
   a load management controller operatively coupled with a second subset of the metered plurality of electrical loads, the second subset comprising a plurality of building lighting loads and a plurality of building HVACR loads, in operative communication with the power circuit interrupter, and configured to:
   repeatedly perform an evaluation of net power consumption of the metered plurality of electrical loads relative to a power consumption criterion,
   repeatedly perform a first test wherein operation of the plurality of HVACR loads is suspended and a time rate of change of temperature of building regions associated with respective ones of the plurality of HVACR loads is determined effective to dynamically rank load shedding priority of the plurality of HVACR loads according to their respective time rate of change of temperature,
   repeatedly perform a second test wherein a lighting controller is operated to rank a plurality of lighting loads according to ambient light of building regions associated with the plurality of lighting loads, effective to dynamically rank load shedding priority of the plurality of lighting loads according to ambient light of their associated building regions,
   assign the plurality of HVACR loads and the plurality of lighting loads to a plurality of load shed groups according to operator specified priority criteria,
   rank the plurality of load shed groups using the load shedding priority rank of the plurality of HVACR loads and the load shedding priority rank of the plurality of light loads assigned to each of the plurality of load shed groups, and
   generate the load shed signal so as to reduce power consumption by the plurality of HVACR loads and the plurality of lighting loads according to the ranked load shed groups effective to minimize occupant perceptibility of the power consumption reduction while implementing the operator specified priority criteria.

2. The system of claim 1 wherein the second subset includes one or more building water heater loads, and wherein the second load management controller is configured to rank load shedding priority of the plurality of building water heater loads and assign the plurality of building water heater loads to the plurality of load shed groups according to operator specified priority criteria.

3. The system of claim 1 wherein the load management controller is configured to determine an occupancy status for each building region associated with respective ones of the plurality of HVACR loads, and wherein dynamically ranking load shedding priority of the plurality of HVACR loads includes evaluating each determined occupancy status.

4. The system of claim 3 wherein the load management controller determines the occupancy status for each building region associated with respective ones of the plurality of HVACR loads using a motion sensor.

5. The system of claim 1 wherein the load management controller is configured to determine an occupancy status for each building region associated with the plurality of lighting loads, and wherein dynamically ranking load shedding priority of the plurality of lighting loads includes evaluating each determined occupancy status.

6. The system of claim 1 wherein the load management controller is configured to initialize the plurality of load shed groups by using the operator specified priority criterion to assign the plurality of HVACR loads and the plurality of lighting loads initially to one of the plurality of load shed groups.

7. The system of claim 1 wherein the load management controller is configured to increase power consumption of the plurality of HVACR loads and the plurality of lighting loads in reverse order of the ranked load shed groups in response the evaluation of net power consumption of the metered plurality of electrical loads relative to the power consumption criterion.

8. A building power management system comprising:
a building power controller configured to measure power consumption of a building, periodically receive a power consumption target value, and transmit a load shed signal in response to determining the measured power consumption is greater than the power consumption target value,
a power interruption device structured to receive the load shed signal from the building power controller and interrupt the flow of power to a building load in response to receiving the load shed signal from the building power controller,
a load shed controller in communication with the building power controller and a plurality of controllable building loads including at least one of a plurality of HVACR loads each corresponding to one of a plurality of HVACR zones, and a plurality of lighting loads each corresponding to one of a plurality of lighting zones, the controller being configured to:
operate each of the plurality of HVACR loads in a testing mode during which the HVACR load is turned off, the change in temperature of the corresponding HVACR zone between a first time and a second time of a testing time period is measured, and the length of time between the first and the second time is measured,
calculate a rate of temperature change for each of the plurality of HVACR zones using the testing time period length measurement and the change in temperature measurement,
dynamically rank the plurality of HVACR loads according to an occupancy status of each of the plurality of HVACR zones and the calculated rate of temperature change,
dynamically rank the plurality of lighting loads according to an occupancy status of each of the plurality of lighting zones and ambient light conditions,
assign each of the plurality of HVACR loads and each of the lighting loads to at least one of a plurality of ranked shed groups including a first ranked shed group and a second ranked shed group using the rankings of the plurality of HVACR loads, the rankings of the plurality of lighting loads, and operator specified business rules,
reduce power consumption of the building in response to receiving the load shed signal by adjusting an HVACR set point of each of the plurality of HVACR loads assigned to the first ranked shed group and adjusting a lighting set point of each of the plurality of lighting loads assigned to the first ranked shed group, and
further reduce power consumption of the building in response to receiving the load shed signal by adjusting the HVACR set point of each of the plurality of HVACR loads assigned to the second ranked shed group and adjusting the lighting set point of each of the plurality of lighting loads assigned to the second ranked shed group.

9. The system of claim 8 wherein the power consumption target value is received from a utility grid system operator as part of a demand response program.

10. The system of claim 8 wherein the load shed controller adjusts the HVACR set points and lighting set points associated with the second ranked shed group in response to determining the measured power consumption still exceeds the target power consumption value following adjusting the HVACR set points and lighting set points associated with the first ranked shed group.

11. The system of claim 8 wherein the plurality of controllable building loads includes a thermal storage device and the load shed controller is configured to assign the thermal storage device to the first ranked shed group and wherein reducing the power consumption of the building in response to receiving the load shed signal includes reducing the set point of the thermal storage device.

12. The system of claim 8 wherein the building power controller is structured to transmit a load activation command in response to comparing the measured power consumption and a target power restoration value, and wherein the load controller is configured to increase power consumption of the second ranked load shed group in response to the load activation command, and increasing the power consumption of the first ranked load shed group in response to determining the target power restoration value is greater than the measured power consumption following increasing the power consumption of the second ranked load shed group.

13. The system of claim 8 wherein the magnitude of each adjustment to HVACR set points and lighting set points is set using operator specified values.

14. The system of claim 8 wherein each of the plurality of HVAC loads corresponding to an unoccupied HVACR zone is assigned to the first ranked load shed group and each of the plurality of lighting loads corresponding to an unoccupied lighting zone is assigned to the first ranked load shed group.

15. The system of claim 8 wherein the load shed controller is configured to operate each of the HVAC loads in a testing mode and update the calculated rate of temperature change for each of the plurality of HVACR zones periodically.

16. A method for reducing power consumption in a building comprising:
operating a first load management controller configured to perform an evaluation of net power consumption of a metered plurality of electrical loads relative to a power consumption criterion and to send a load shed signal responsive to the evaluation;
operating a power circuit interrupter in operative communication with the first load management controller and operatively coupled with a first subset of the metered plurality of electrical loads, the power circuit interrupter configured to interrupt power to the first subset of the metered plurality of electrical loads in response to the load shed signal; and
operating a second load management controller in operative communication with the first load management controller and operatively coupled with a second subset of the metered plurality of electrical loads, the second subset comprising at least two of a plurality of building lighting loads, a plurality of building HVACR loads, and a plurality of thermal storage loads;
repeatedly performing, with the second load management controller, a first test wherein operation of the plurality of HVACR loads is suspended and a time rate of change of temperature of building regions associated with respective ones of the plurality of HVACR loads is determined effective to automatically and dynamically rank load shedding priority of the plurality of HVACR loads according to their respective time rate of change of temperature;
repeatedly performing, with the second load management controller, a second test wherein a lighting controller is operated to rank a plurality of lighting loads according to ambient light of building regions associated with the plurality of lighting loads, effective to automatically and dynamically rank load shedding priority of the plurality of lighting loads according to ambient light of their associated building regions;

assigning, with the second load management controller, the plurality of HVACR loads and the plurality of lighting loads to a plurality of load shed groups according to operator specified priority criteria;

ranking, with the second load management controller, the plurality of load shed groups using the load shedding priority rank of the plurality of HVACR loads and the load shedding priority rank of the plurality of light loads assigned to each of the plurality of load shed groups, and reducing, with the second load management controller, power consumption by the plurality of HVACR loads and the plurality of lighting loads in order of the ranked load shed groups effective to minimize occupant perceptibility of the power consumption reduction while implementing the operator specified priority criteria in response to the load shed signal.

17. The method of claim 16 wherein assigning includes determining whether each of the building regions associated with each of the plurality of HVACR loads is occupied, and assigning each of the plurality of HVACR loads associated with an unoccupied building region to the lowest priority load shed group.

18. The method of claim 16 wherein reducing includes adjusting a set point of each HVACR load, lighting load, or thermal storage load associated with the load shed group by an operator specified value.

19. The method of claim 16 wherein the evaluation of net power consumption of the metered plurality of electrical loads relative to the power consumption criterion is performed in real-time.

20. The method of claim 19 wherein the power consumption criterion is modified in response to a demand response signal received from a system operator.

* * * * *